United States Patent
Lexilus

(10) Patent No.: US 12,480,410 B2
(45) Date of Patent: Nov. 25, 2025

(54) DAMPING DEVICE FOR A ROTOR WHEEL OF AN AIRCRAFT TURBINE ENGINE, ROTOR WHEEL FOR AN AIRCRAFT TURBINE ENGINE, TURBINE ENGINE FOR AN AIRCRAFT, AND METHOD FOR MANUFACTURING A DAMPING DEVICE

(71) Applicant: SAFRAN AIRCRAFT ENGINES, Paris (FR)

(72) Inventor: Jean-Hilaire Lexilus, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/687,378

(22) PCT Filed: Aug. 31, 2022

(86) PCT No.: PCT/FR2022/051638
§ 371 (c)(1),
(2) Date: Feb. 28, 2024

(87) PCT Pub. No.: WO2023/031556
PCT Pub. Date: Mar. 9, 2023

(65) Prior Publication Data
US 2024/0360767 A1    Oct. 31, 2024

(30) Foreign Application Priority Data
Sep. 1, 2021   (FR) ........................................ 2109134

(51) Int. Cl.
*F01D 5/22*   (2006.01)

(52) U.S. Cl.
CPC .......... *F01D 5/22* (2013.01); *F05D 2220/323* (2013.01); *F05D 2230/60* (2013.01); *F05D 2240/30* (2013.01); *F05D 2260/96* (2013.01)

(58) Field of Classification Search
CPC . F01D 5/22; F01D 11/006; F01D 5/26; F01D 5/10; F01D 11/008; F01D 5/3015;
(Continued)

(56) References Cited

U.S. PATENT DOCUMENTS 4,177,013 A * 12/1979 Patterson .................. F01D 5/22
                                            416/193 A
5,205,713 A *  4/1993 Szpunar .................... F01D 5/26
                                            416/193 A
(Continued)

FOREIGN PATENT DOCUMENTS

CN      204941612 U    1/2016
FR      1.579.923 A    8/1969
(Continued)

OTHER PUBLICATIONS

Machine Translation of JP 2015135076A [retrieved on Feb. 6, 2025]. Retrieved from: Espacenet. (Year: 2025).*
(Continued)

*Primary Examiner* — Eric J Zamora Alvarez
(74) *Attorney, Agent, or Firm* — Oblon, McClelland, Maier & Neustadt, L.L.P.

(57) ABSTRACT

A damper for an impeller of an aircraft turbomachine includes an elastic member housed in two metallic half-shells so as to allow a relative movement of the half-shells relative to one another.

7 Claims, 6 Drawing Sheets

(58) Field of Classification Search
CPC ........ F01D 25/04; F01D 25/06; F01D 5/3069;
F01D 5/326; F01D 5/3007; F01D 5/3053;
F01D 5/323; F01D 5/02; F01D 5/027;
F01D 5/16; F01D 5/30; F01D 5/3092;
Y10S 416/50; F05D 2240/80; F05D
2260/96; F05D 2220/36; F05D 2220/32;
F05D 2220/323; F05D 2230/51; F05D
2240/30; F05D 2260/30; F05D 2300/43;
F05D 2210/12; F05D 2230/54; F05D
2230/60; F05D 2240/20; F05D 2240/242;
F05D 2250/231; F05D 2250/241; F05D
2250/71; F05D 2260/38; F05D 2260/84;
F05D 2300/175; F05D 2300/501; F04D
29/322; F04D 29/668; F16F 15/12
See application file for complete search history.

(56) References Cited

U.S. PATENT DOCUMENTS 5,700,133 A * 12/1997 Surdi ........................ F01D 5/22
416/500
8,911,210 B2 * 12/2014 Bilz ...................... F01D 5/3053
416/193 A
9,303,519 B2 * 4/2016 Tarczy ..................... F01D 5/10
2017/0067349 A1 * 3/2017 Kareff ...................... F01D 5/22

FOREIGN PATENT DOCUMENTS

| FR | 2 669 686 A1 | 5/1992 |
| FR | 2 934 873 A1 | 2/2010 |
| FR | 2 949 142 A1 | 2/2011 |
| JP | 2014-167263 A | 9/2014 |
| JP | 2015-135076 A | 7/2015 |

OTHER PUBLICATIONS

International Search Report mailed on Oct. 24, 2022 in PCT/FR2022/051638 filed on Aug. 31, 2022 (3 pages).
Anonymous. "Zoom sur le procede de l'adherisation et ses avantages", Sep. 30, 2020 (Sep. 30, 2020), Retrieved from the Internet: https://web.archive.org/web/20200930102510/https://www.machines-outil.fr/focus-sur-adherisation/[retrieved on Jan. 13, 2022.] XP055878974, 4 pages.

* cited by examiner

DAMPING DEVICE FOR A ROTOR WHEEL OF AN AIRCRAFT TURBINE ENGINE, ROTOR WHEEL FOR AN AIRCRAFT TURBINE ENGINE, TURBINE ENGINE FOR AN AIRCRAFT, AND METHOD FOR MANUFACTURING A DAMPING DEVICE

TECHNICAL FIELD

The invention relates to the field of turbomachines for aircraft propulsion units.

PRIOR ART

The rotor of a conventional aeronautical turbomachine comprises impellers, each formed by a disc and a plurality of blades arranged in circumferential succession. Each blade comprises a root received in a respective recess formed at the periphery of the disc. In order to dampen the vibratory responses of such an impeller during operation of the turbomachine, it is known to place sheet metal members between the disc and the blades so as to dissipate the vibratory energy by dry friction between these members and the impeller.

Such a damping member is generally housed in a cavity delimited circumferentially by the shanks of two adjacent blades, radially towards the outside by the platforms of these blades and radially towards the inside by a tooth of the disc.

Under the rotary action of the impeller about the radial axis, such a damping member can be pivoted about the radial axis so as to be pressed axially upstream against one of the blade shanks delimiting the cavity and axially downstream against the other blade shank delimiting the cavity, which tends to damage the shanks.

DISCLOSURE OF THE INVENTION

The invention aims to provide a damping device that can reduce the wear of the surrounding parts.

To this end, one object of the invention is a damping device for the impeller of an aircraft turbomachine according to the present disclosure.

The elastic member enables the damper to deform, allowing relative movements of the support elements and dissipating some of the forces to which it is subjected.

The damping device according to the invention thus reduces the tangential forces applied to the shanks, or more generally to the parts with which the support elements come into contact, and thus reduces their wear, whilst ensuring good damping performance.

Each shell preferably comprises a free edge, an inner surface delimiting the hollow space of this shell and an outer surface, the inner surface and the outer surface of each shell being delimited by the free edge of this shell, the device being designed such that the free edges of the two shells are facing one another.

The free edges of the two shells define a gap between them to prevent them coming into contact with each other, at least when the device is not subjected to external stress and preferably during all phases of turbomachine operation.

Such an arrangement of the free edges allows, on the one hand, the device to be deformed by compression of the elastic member under the action of a force exerted on the shells and, on the other hand, prevents the free edges of the shells coming into contact with the shanks defining the cavity receiving the device.

The outer surface of each of the shells is preferably smooth.

In other words, the outer surface of each of the shells preferably has no ridges or protruding parts.

In one embodiment, the outer surface of each of the shells comprises a side part intended to be arranged opposite said shank of a respective one of said blades.

In one embodiment, the outer surface of each of the shells comprises a lower part intended to be arranged opposite a tooth of a disc of said impeller.

In one embodiment in which the outer surface of each of the shells comprises a side part and a lower part, the lower part is preferably connected to the side part by a rounded edge.

In one embodiment, the outer surface of each of the shells comprises an upper part intended to be arranged opposite a platform of a respective one of said blades.

In one embodiment in which the outer surface of each of the shells comprises a side part and an upper part, the upper part is preferably connected to the side part by a rounded edge.

In one embodiment, the elastic member comprises a first material and the support elements comprise a second material different from the first material.

The first material can be an elastomeric material preferably comprising polyurethane or fluoroethane.

The second material can be a metal alloy preferably comprising nickel.

Such a metal alloy provides a high coefficient of friction with the impeller, which increases the efficiency of dissipating vibration energy during friction.

Another object of the invention is an impeller for an aircraft turbomachine, extending about a longitudinal axis and comprising a disc and blades, the disc forming teeth defining recesses between them circumferentially, the blades each comprising a platform, a shank and a root received in a respective one of the recesses, the impeller forming a cavity delimited circumferentially by the shanks of two of said blades which are arranged in circumferential succession, the cavity being delimited radially towards the inside by one of the teeth extending circumferentially between the roots of these two blades and radially towards the outside by the platforms of these two blades, the impeller comprising a damping device as described above housed in the cavity.

Another object of the invention is a compressor for a turbomachine comprising such an impeller and a turbine for a turbomachine comprising such an impeller.

Another object of the invention is an aircraft turbomachine, comprising such a compressor and/or such a turbine and/or such an impeller and/or a damping device as described above.

According to another aspect, one object of the invention is a method for manufacturing a damping device as described above.

In one embodiment, this method comprises a step of drawing two metal sheets so as to form said shells.

According to one embodiment, the method comprises a step of assembling the elastic member and the two shells or support elements.

The assembly step preferably comprises a cold or hot bonding operation.

Such assembly methods are simple and cost-effective.

Other advantages and features of the invention will become apparent upon reading the detailed, non-limiting description below.

BRIEF DESCRIPTION OF THE DRAWINGS

The following detailed description refers to the accompanying drawings in which.

DETAILED DESCRIPTION OF EMBODIMENTS

Figure 1:
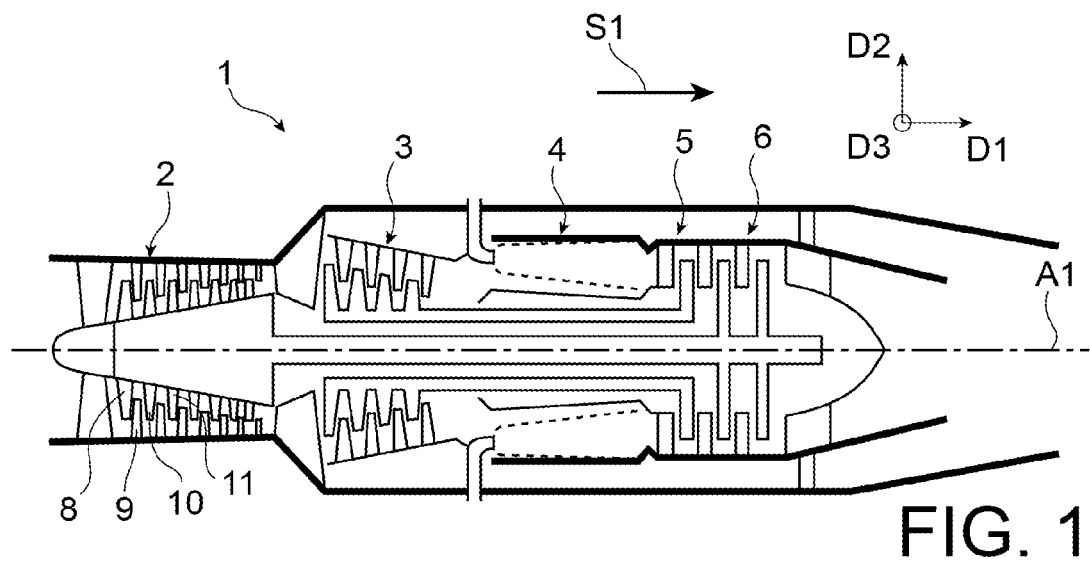
FIG. 1 is a schematic axial cross-section of a turbofan engine.

FIG. 1 shows a low bypass ratio turbofan engine 1, designed to propel an aircraft.

The turbofan engine 1 has a central longitudinal axis A1 around which its various components extend.

In the present description, the terms "upstream" and "downstream" are defined with reference to a direction S1 of man gas flow in the turbofan engine 1 along the axis A1.

FIGS. 1 to 9 comprise a reference frame defining an axial or longitudinal direction D1 corresponding to the direction of the axis A1, a radial direction D2 and a tangential or circumferential direction D3.

The turbofan engine 1 comprises, from upstream to downstream, a low pressure compressor 2, a high pressure compressor 3, a combustion chamber 4, a high pressure turbine 5 and a low pressure turbine 6 forming a gas generator.

The low pressure compressor 2 and the low pressure turbine 6 form a low pressure spool. The high pressure compressor 3 and the high pressure turbine 5 form a high pressure spool.

In a manner known per se, the compressors 2 and 3 as well as the turbines 5 and 6 each comprise a rotor and a stator forming one or more stages. Generally speaking, a compressor stage comprises, from upstream to downstream, a bladed impeller which draws in and accelerates a flow of air and a diffuser designed to rectify the flow thus accelerated, increasing its pressure. For its part, a turbine stage comprises, from upstream to downstream, a distributor and a bladed impeller, the distributor being designed to accelerate the air flow towards the impeller to make it rotate.

In the example shown in FIG. 1, the low pressure compressor 2 comprises seven stages, the high pressure compressor 3 comprises four, the high pressure turbine 5 comprises one and the low pressure turbine 6 comprises two. Of course, each of the modules of the gas generator can have a different number of stages without departing from the scope of the invention.

In FIG. 1, the impeller and the diffuser of the first stage of the low pressure compressor 2 respectively bear reference numbers 8 and 9. The impeller of the second stage of this compressor 2 bears reference number 10 and that of the third stage reference number 11.

The description below relates by way of example and in a non-limiting manner to the impeller 8 of the first stage of the low pressure compressor 2 shown in FIG. 1.

Of course, the impeller described below can form another impeller of the compressor 2, for example the impeller 10 or 11, or of another module of the turbofan engine 1 shown in FIG. 1, for example of the high pressure compressor 3, or even an impeller of a turbomachine other than the one shown in FIG. 1. The description below applies mutatis mutandis to these various applications.

Figure 2:
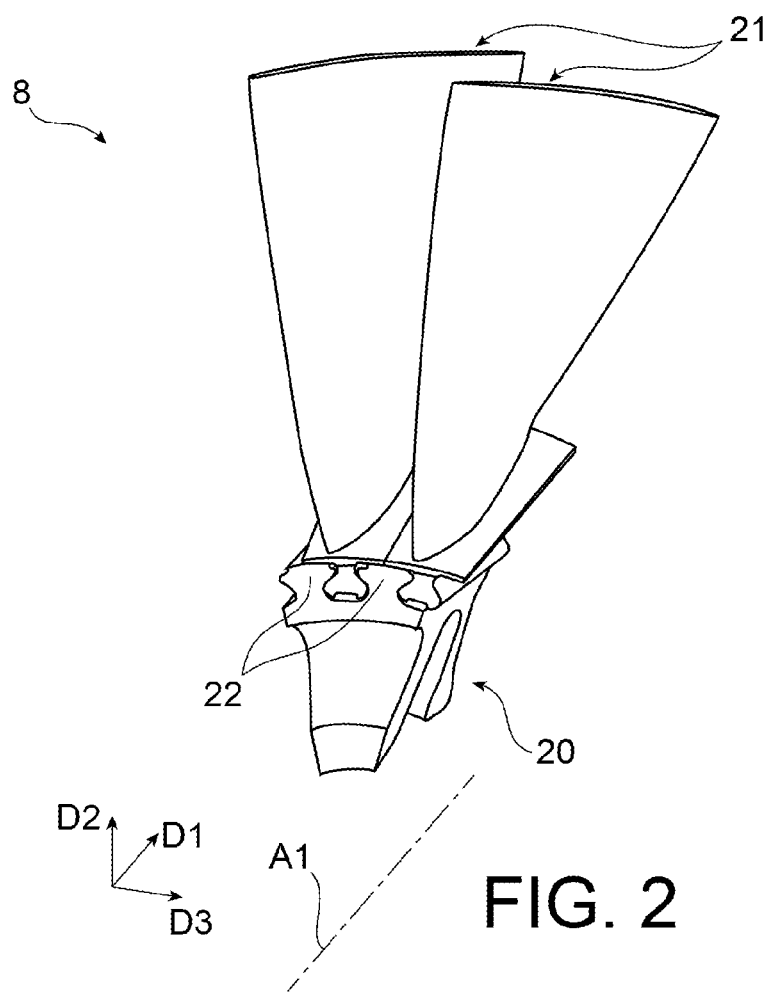
FIG. 2 is a schematic perspective view of an angular sector of an impeller according to the invention.
Figure 3:
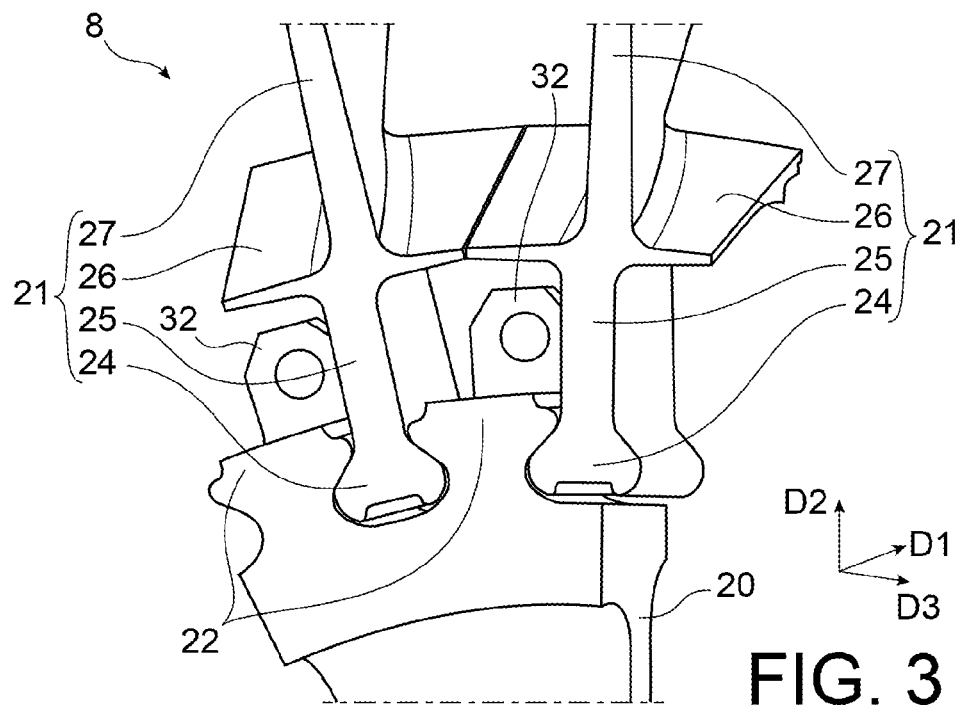
FIG. 3 is a schematic perspective view and cross-section of part of the impeller shown in FIG. 2.

FIGS. 2 and 3 show an angular sector of the impeller 8.

In a manner known per se, the impeller 8 comprises a disc 20 and blades 21—two of which are shown in FIGS. 2 and 3—supported by the disc 20 and arranged side by side in the circumferential direction D3.

To this end, the disc 20 has teeth 22 at its periphery that circumferentially define blade-housing recesses between them. In this example, each recess extends in a direction substantially parallel to the axis A1 so as to form an opening through the disc 20 from upstream to downstream.

Each blade 21 comprises, radially from the inside to the outside, a root 24, a shank 25, a platform 26 and a tip 27 forming the aerodynamic part of the blade 21 (see FIG. 3). In this example, the root 24 of each blade 21 has an outer shape known as a "fir tree" or "bulb", enabling it to be inserted into one of the recesses of the disc, which has a corresponding shape.

Each blade 21 is thus mounted on the disc 20 by inserting its root 24 into a respective one of the recesses.

The two blades 21 shown in FIGS. 2 and 3, which are arranged in circumferential succession, delimit a cavity with the disc 20. This cavity is delimited circumferentially by the shanks 25 of these two blades 21, radially towards the inside by the tooth 22 extending circumferentially between the roots 24 of these two blades 21 and radially towards the outside by the platforms 26 of these two blades 21.

Figure 4:
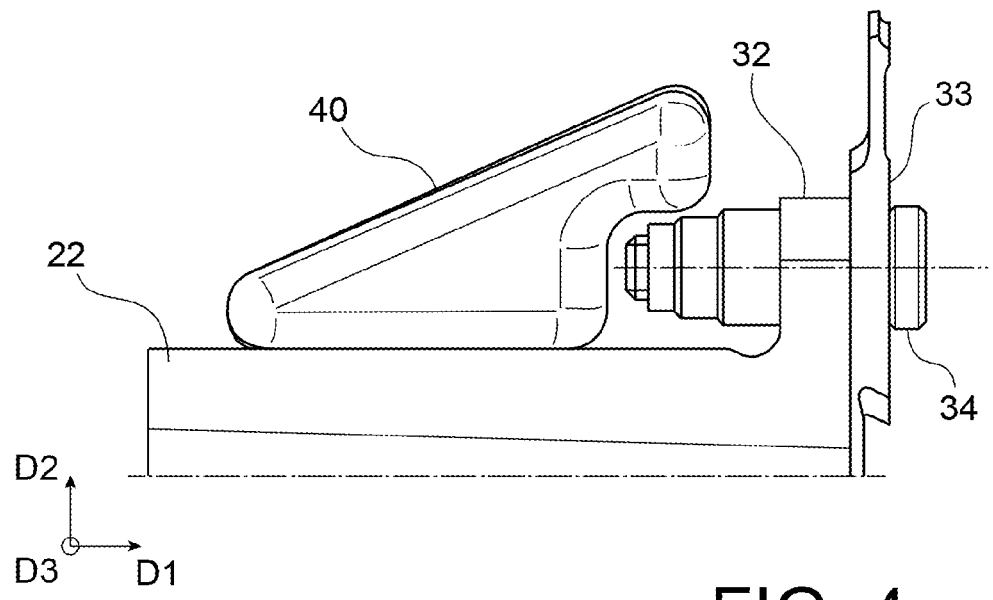
FIG. 4 is a schematic view of part of the impeller shown in FIG. 2, including a damper according to the invention.

Each pair of blades 21 that are arranged in circumferential succession delimit a similar cavity. The description below relates to the cavity extending between the two blades 21 shown in FIGS. 2 and 3 and applies mutatis mutandis to each of the other cavities. With reference to FIGS. 3 and 4, each tooth 22 of the disc 20 forms a lug 32 projecting radially outwards at a downstream end of the tooth 22 so as to form a downstream surface of the disc 20.

FIG. 4 shows a retaining ring 33 resting on the downstream surface formed by the teeth 22 of the disc 20 of the impeller 8.

The ring 33 is fixed to the disc by connection means 34 forming in this example bolts that each pass through a hole in a respective one of the lugs 32.

The ring 33 has a radial dimension enabling it to axially close off the downstream blade-housing recesses formed by the disc 20 of the impeller 8, thus forming a downstream axial stop for the blades 21.

In this example, the ring 33 is formed by an upstream end of a collar integral with the disc of the impeller 10 of the second stage of the compressor 2 shown in FIG. 1. In this example, another annular stop member (not shown) is mounted upstream of the disc 20 so as to form an upstream axial stop for the blades 21.

Figure 5:
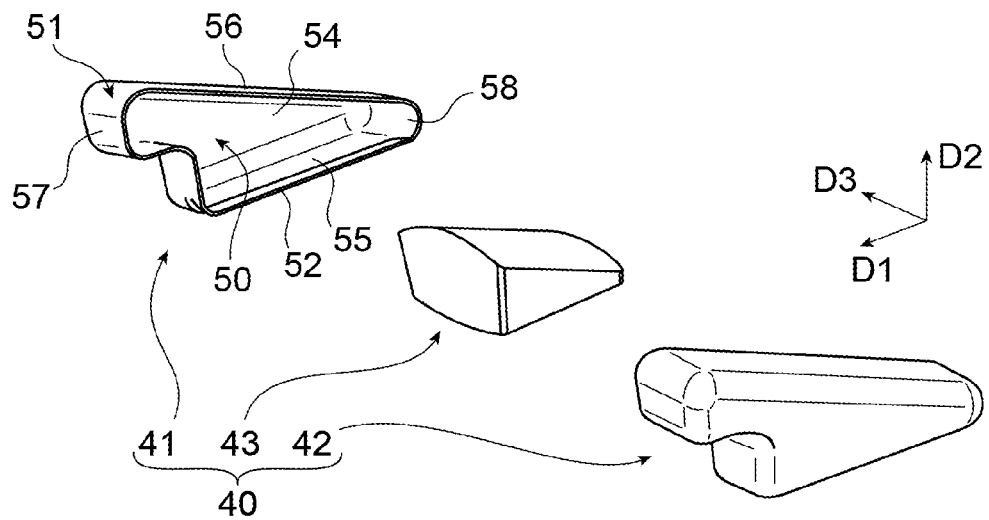
FIG. 5 is a schematic perspective and exploded view of the damper shown in FIG. 4.
Figure 6:
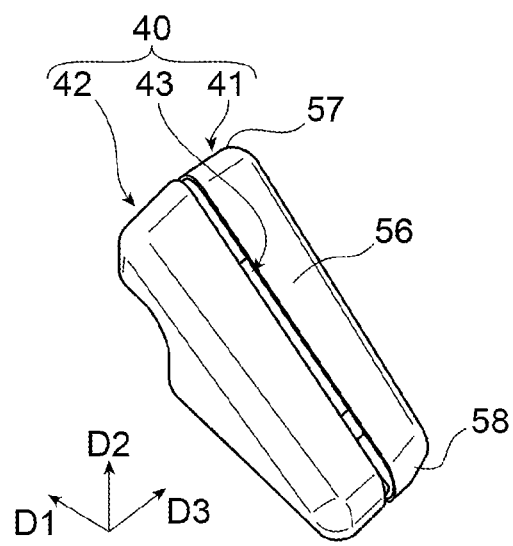
FIG. 6 is a schematic perspective view of the damper shown in FIG. 5.
Figure 7:
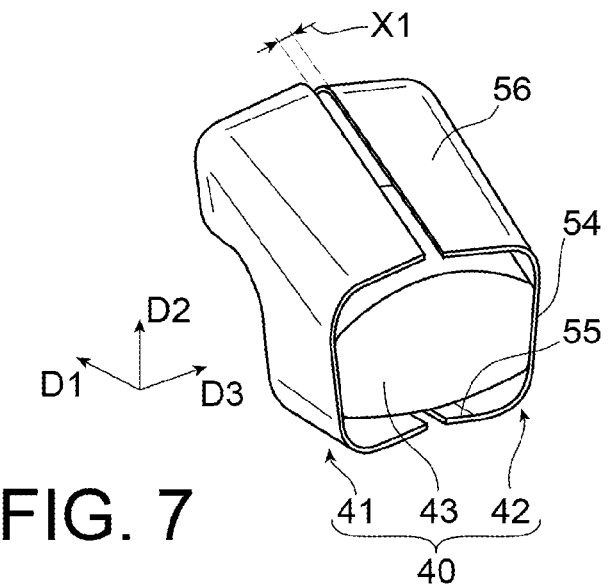
FIG. 7 is a schematic perspective view and cross-section of the damper shown in FIG. 6.
Figure 8:
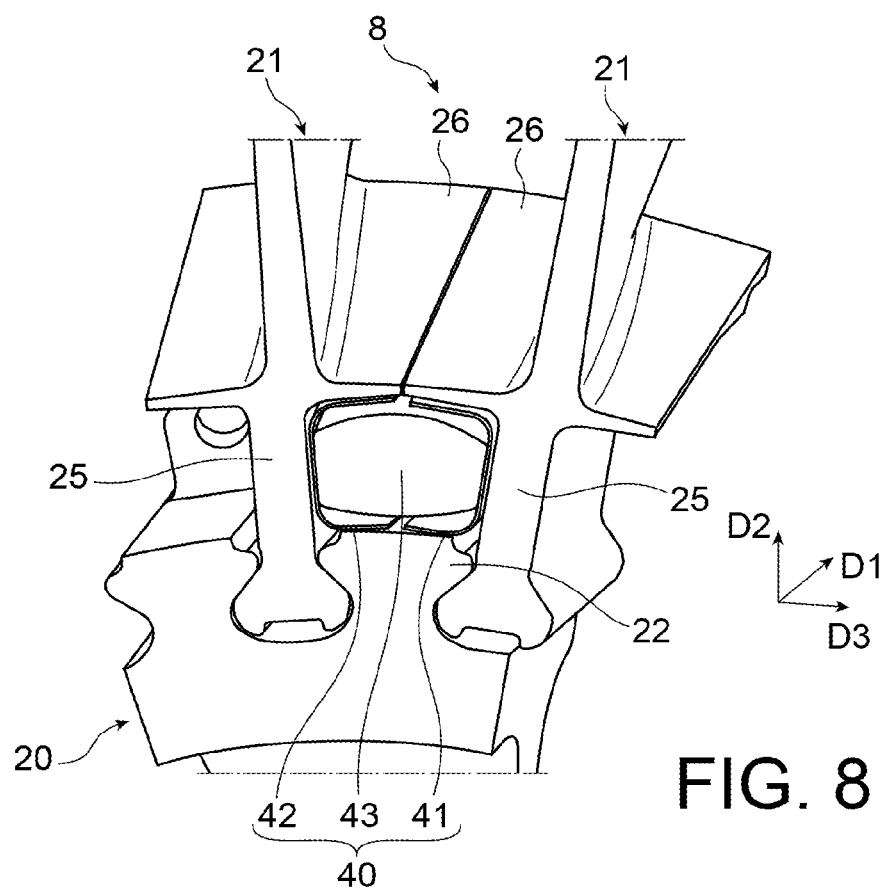
FIG. 8 is a schematic perspective view and cross-section of part of the impeller shown in FIG. 2, including the damper shown in FIG. 5.
Figure 9:
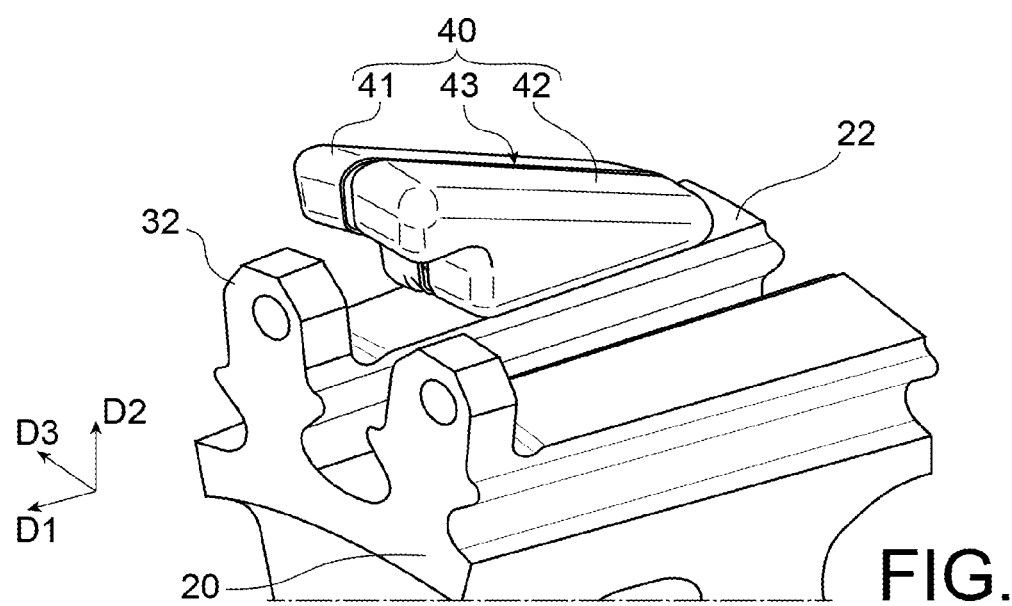
FIG. 9 is a schematic perspective view of part of the impeller shown in FIG. 2, including the damper shown in FIG. 5.

The invention relates more specifically to a damping device 40, also referred to as a damper, designed to be housed in the aforementioned cavity so as to dampen the vibratory responses of the impeller 8 during operation of the turbofan engine 1. FIGS. 5 to 7 show a damper 40 according to the invention, FIGS. 4, 8 and 9 shows its relative position in the cavity relative to the other parts of the impeller 8.

The reference frame D1-D2-D3 in FIGS. 5 to 7 shows the relative position of the damper 40 when it is thus housed in the cavity.

With reference to FIG. 5, the damper 40 comprises three parts 41, 42 and 43, the parts 41 and 42 forming support elements, the part 43 forming an elastic member.

In this example, the support elements 41 and 42 are each formed by a nickel metal sheet having a thickness of less than or equal to 1 mm which is stamped so as to form a hollow space.

The support element 41 comprises an inner surface 50 and an outer surface 51 which define between them the thickness of the metal sheet forming this support element 41. The support element 41 forms a free edge 52 which delimits the inner 50 and outer 51 surfaces and which defines a closed curve.

From a geometric point of view, the inner surface 50 and the outer surface 51 are non-developable surfaces.

The inner surface 50 of the support element 41 delimits said hollow space formed by this part.

With reference to FIGS. 5 to 7, the support element 41 forms a side part 54, a lower part 55, an upper part 56, a downstream part 57 and an upstream part 58. The lower 55, upper 56, downstream 57 and upstream 58 parts are each delimited by a respective part of the free edge 52.

The support element 41 is designed such that the outer surface 51 is smooth.

In particular, the lower 55, upper 56, downstream 57 and upstream 58 parts are each connected to one other and to the side part 54 by smooth transitions forming rounded edges on the outer surface 51.

In this example, the lower 55 and upper 56 parts extend opposite one another and substantially perpendicular relative to the side part.

The free edge 52 of the support element 41 extends in a plan which is in this case parallel to the directions D1 and D2.

The support elements 41 and 42 are symmetrical to one another such that what has just been described applies mutatis mutandis to the support element 42.

In this example, the elastic member 43 is made of a material, for example of polyurethane or fluoroethane.

As shown in FIGS. 5 to 7, the elastic member 43 is arranged between the support elements 41 and 42 such that part of the elastic member 43 is housed in the hollow space formed by the support element 41 and another part of the elastic member 43 is housed in the hollow space formed by the support element 42, such that the free edge 52 of the support element 41 is opposite the free edge of the support element 42, defining between them a gap X1 (see FIG. 7).

Each of the support elements 41 and 42 thus forms a shell or half-shell, defining a hollow space in which a respective part of the elastic member 43 is housed.

In this example, the elastic member 43 is fixed to the inner surface 50 of the side part 54 of each of the support elements 41 and 42 using a cold or hot bonding type method.

The gap X1 between the free edges 52 of the support elements 41 and 42 allows a relative movement of these parts towards one another under the action of external forces exerted on their side part 54 and of corresponding compression of the elastic member 43.

With reference to FIG. 8, the damper 40 is housed in the aforementioned cavity of the impeller 8 such that:

the side part 54 of the support element 41 is arranged opposite the shank 25 of a first of the blades 21 delimiting this cavity and the side part of the support element 42 extends opposite the shank 25 of a second of the blades 21 delimiting this cavity, the lower part 55 of each of the support elements 41 and 42 is arranged opposite the tooth 22 delimiting this cavity (see also FIGS. 4 and 9), the upper part 56 of the support element 41 is arranged opposite the platform 26 of said first blade 21 and the upper part of the support element 42 is arranged opposite the platform 26 of said second blade 21.

The damper 40 according to the invention thus reduces the wear of the shanks 25 with which it comes into contact during operation of the turbofan engine 1.

Of course, such a damper 40 can be arranged in each of the cavities formed by the various pairs of adjacent blades 21 of the impeller 8 or of another impeller.

In addition, the support elements 41 and 42 and the elastic member 43 can have a geometry different from the one described above, in particular depending on the geometry of the cavity in which the damper 40 is intended to be housed.

The invention claimed is:

1. An impeller for an aircraft turbomachine, extending about a longitudinal axis and comprising:
a disc and blades, the disc forming teeth defining recesses between the teeth circumferentially, the blades each comprising a platform, a shank and a root received in a respective one of the recesses, the shank being delimited between the platform and the root and being distinct from the platform and the root, the impeller forming a cavity delimited circumferentially by the shanks of two of said blades which are arranged in circumferential succession, the cavity being delimited radially inside towards one of the teeth extending circumferentially between the roots of the two blades and radially outside towards the platforms of the two blades, and
a damping device housed in the cavity, the damping device comprising
first and second support elements, and
an elastic member arranged between the first and second support elements so as to allow a relative movement of the first and second support elements towards one another under action of external forces exerted on the first and second support elements and of compression of the elastic member, the damping device being arranged between two blades of said impeller which are arranged in circumferential succession such that the first support element is opposite a shank of one of the blades and the second support element is opposite a shank of the other of said blades,
wherein each of the first and second support elements forms a shell defining a hollow space in which a respective part of the elastic member is housed.

2. An aircraft turbomachine, comprising the impeller according to claim 1.

3. The impeller according to claim 1, wherein each shell comprises a free edge, an inner surface delimiting the hollow space of the shell and an outer surface, the inner surface and the outer surface of each shell being delimited by the free edge of the shell, the damping device being designed such that the free edges of the two shells are facing one another.

4. The impeller according to claim 3, wherein the outer surface of each of the shells is smooth.

5. The impeller according to claim 3, wherein the outer surface of each of the shells comprises a side part arranged opposite said shank of a respective one of said blades, a lower part arranged opposite a tooth of the disc of said impeller and an upper part arranged opposite the platform of a respective one of said blades, the lower and upper parts each being connected to the side part by a curve.

6. The device impeller according to claim 1, wherein the elastic member comprises a first material, and the support elements comprise a second material.

7. The impeller according to claim 6, wherein the first material is an elastomeric material comprising polyurethane or fluoroethane, and the second material is a metal alloy comprising nickel.

* * * * *